United States Patent
Marshalkin et al.

(10) Patent No.: US 12,255,911 B1
(45) Date of Patent: Mar. 18, 2025

(54) METHOD FOR DETECTING ANOMALIES IN GROUPS OF USER VERIFICATION REQUESTS

(71) Applicant: Raritex Trade Ltd, Nicosia (CY)

(72) Inventors: Nikita Evgenievich Marshalkin, Berlin (DE); Dmitrii Sergeevich Iurasov, Belgrade (RS)

(73) Assignee: Raritex Trade Ltd, Nicosia (CY)

( * ) Notice: Subject to any disclaimer, the term of this patent is extended or adjusted under 35 U.S.C. 154(b) by 0 days.

(21) Appl. No.: 18/733,767

(22) Filed: Jun. 4, 2024

Related U.S. Application Data (63) Continuation of application No. 18/400,060, filed on Dec. 29, 2023.

(51) Int. Cl.
H04L 9/40 (2022.01)

(52) U.S. Cl.
CPC ...... H04L 63/1425 (2013.01); H04L 63/0876 (2013.01); H04L 63/104 (2013.01)

(58) Field of Classification Search
CPC ............. H04L 63/1425; H04L 63/0876; H04L 63/104; H04L 63/1408; H04L 63/1441; H04L 43/04; H04L 43/062
See application file for complete search history.

(56) References Cited

U.S. PATENT DOCUMENTS

| | | | |
|---|---|---|---|
| 12,056,006 B1 * | 8/2024 | Bishop | G06F 11/0793 |
| 2016/0112440 A1 * | 4/2016 | Kolton | H04L 69/16 726/1 |

(Continued)

FOREIGN PATENT DOCUMENTS

| | | |
|---|---|---|
| CN | 110543506 A | 12/2019 |
| CN | 115883187 A | 3/2023 |

OTHER PUBLICATIONS

Santin et al., "A Framework for Verifiable and Auditable Collaborative Anomaly Detection," IEEE Access Year: 2022 | vol. 10 | Journal Article | Publisher: IEEE.*

(Continued)

*Primary Examiner* — Roderick Tolentino
(74) *Attorney, Agent, or Firm* — ASLAN LAW, P.C.

(57) ABSTRACT

The technical solution relates to technologies for detecting fraudulent serial user verification requests.

A method for detecting anomalies in groups of users' verification requests performed by a processor comprises the following steps: receiving users' verification requests and user's device identifying parameters; generating device fingerprint based on the user's device identifying parameters for each verification request; grouping verification requests that match by device fingerprint; within the group of verification requests with matching device fingerprints searching for verification requests that match by at least one additional attribute of the request; in response to identifying coincidence of at least one additional attribute of the request for the whole group of said verification requests, marking the whole group as anomalous, in response to identifying coincidence of said additional attribute of the request in a subgroup or multiple subgroups within said group of verification requests, marking such subgroup or subgroups as anomalous; otherwise, marking the verification requests for which no coinciding additional attribute of the request has been found as non anomalous.

19 Claims, 5 Drawing Sheets

(56) References Cited

U.S. PATENT DOCUMENTS

| | | | |
|---|---|---|---|
| 2019/0163559 A1* | 5/2019 | Takahashi | G06F 11/0793 |
| 2020/0053111 A1* | 2/2020 | Jakobsson | H04L 63/1416 |
| 2022/0021655 A1* | 1/2022 | Ramaswamy | H04L 41/5006 |
| 2022/0035777 A1* | 2/2022 | Seth | G06N 5/04 |
| 2022/0164643 A1* | 5/2022 | Charnock | G06N 3/04 |
| 2023/0121058 A1* | 4/2023 | Kinyon | G06F 21/554 |
| | | | 726/7 |
| 2024/0129323 A1* | 4/2024 | Garyani | G06F 21/554 |
| 2024/0314137 A1* | 9/2024 | Grover | H04L 63/08 |

OTHER PUBLICATIONS

Sithirasenan et al., "Substantiating Security Threats Using Group Outlier Detection Techniques," IEEE Globecom 2008—2008 IEEE Global Telecommunications Conference Year: 2008 | Conference Paper | Publisher: IEEE.*
Web Antifraud LLC, Interface for anti-fraud analytics, publication on website https://www.antifraud2.ru/interfejs-dlya-antifrod-analitiki, Dec. 28, 2023, 4 pages.
Callsign Inc, Detecting fraud with device fingerprinting, publication on website https://www.callsign.com, Dec. 28, 2023, 3 pages.
Jason Wu, Network Analysis for Anti Money Laundering with Python, publication on website. https://medium.com/@jasonclwu/network-analysis-for-anti-money-laundering-with-python-ad981792a947, Dec. 28, 2023, 28 pages.
Web Antifraud LLC, How does antifraud system work?, publication on website https://www.antifraud2.ru/kak-rabotaet-antifrod-sistema, Dec. 28, 2023, 5 pages.

* cited by examiner

METHOD FOR DETECTING ANOMALIES IN GROUPS OF USER VERIFICATION REQUESTS

RELATED APPLICATION DATA

This application is a Continuation of and claims the benefit of priority to Ser. No. 18/400,060 filed on Dec. 29, 2023. The entire contents of each of the above-identified applications are hereby incorporated by reference in their entirety.

FIELD OF TECHNOLOGY

The technical solution relates to technologies for detecting fraudulent serial user verification requests.

PRIOR ART

Online-services often require their potential users to pass identity verification in order to comply with know-your-client regulation or for other reasons, including, safety and prevention of various kinds of fraud. The identity verification online normally requires submission of a set of personal and other data about the user passing verification via their personal device (a smartphone, a laptop, a personal computer etc).

One of the issues with online identity verification is that it is prone to attempts of mass registration of fake accounts. Mass registration of fake accounts may be done using document forgery and identity spoofing or with help of front persons, such as "money mules" who pass verification under their real identity and genuine documents but transfer control over their user account to a third party. Mass registration is often performed with the use of the same device and in the same physical location.

The described solution uses behavioral and network analysis technologies in order to identify mass fraudulent identity verification attempts.

SUMMARY

Figure 1:
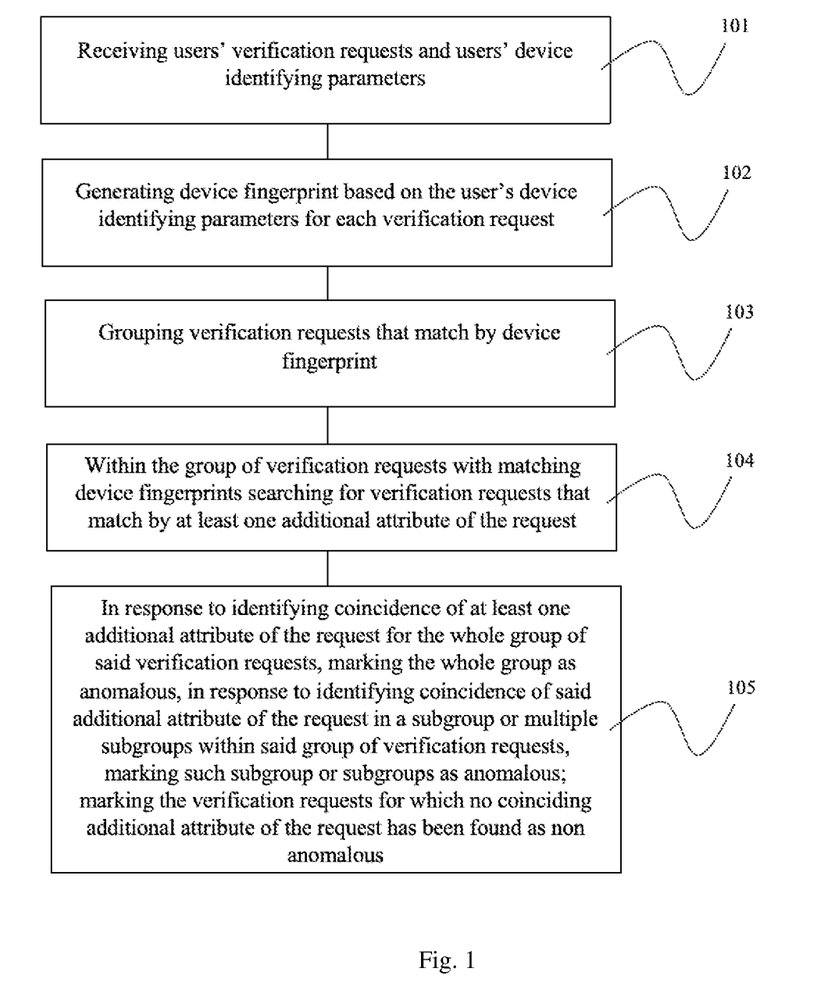
FIG. 1—block diagram illustrating one of possible embodiments

A method for detecting anomalies in groups of user verification requests performed by a processor comprising the following steps (FIG. 1): receiving users' verification requests and users' device identifying parameters; generating device fingerprint based on the user's device identifying parameters for each verification request; grouping verification requests that match by device fingerprint; within the group of verification requests with matching device fingerprints searching for verification requests that match by at least one additional attribute of the request; in response to identifying coincidence of at least one additional attribute of the request for the whole group of said verification requests, marking the whole group as anomalous, in response to identifying coincidence of said additional attribute of the request in a subgroup or multiple subgroups within said group of verification requests, marking such subgroup or subgroups as anomalous; otherwise, marking the verification requests for which no coinciding additional attribute of the request has been found as non anomalous.

In some embodiments an additional attribute of the request is a descriptor generated for the background of the image or video depicting the face of the user being verified.

In some embodiments an additional attribute of the request is a descriptor generated for the background of the image or video depicting a document provided with the verification request.

In some embodiments an additional attribute of the request is a descriptor generated for the text extracted from a document provided with the verification request.

In some embodiments an additional attribute of the request is the timeframe (time and date) when the verification request has been submitted.

In some embodiments an additional attribute of the request is the timeframe which indicates a period starting 6 hours or less before the time and date when the verification request has been submitted and ending 6 hours or less after the time and date when the verification request has been submitted.

Figure 2:
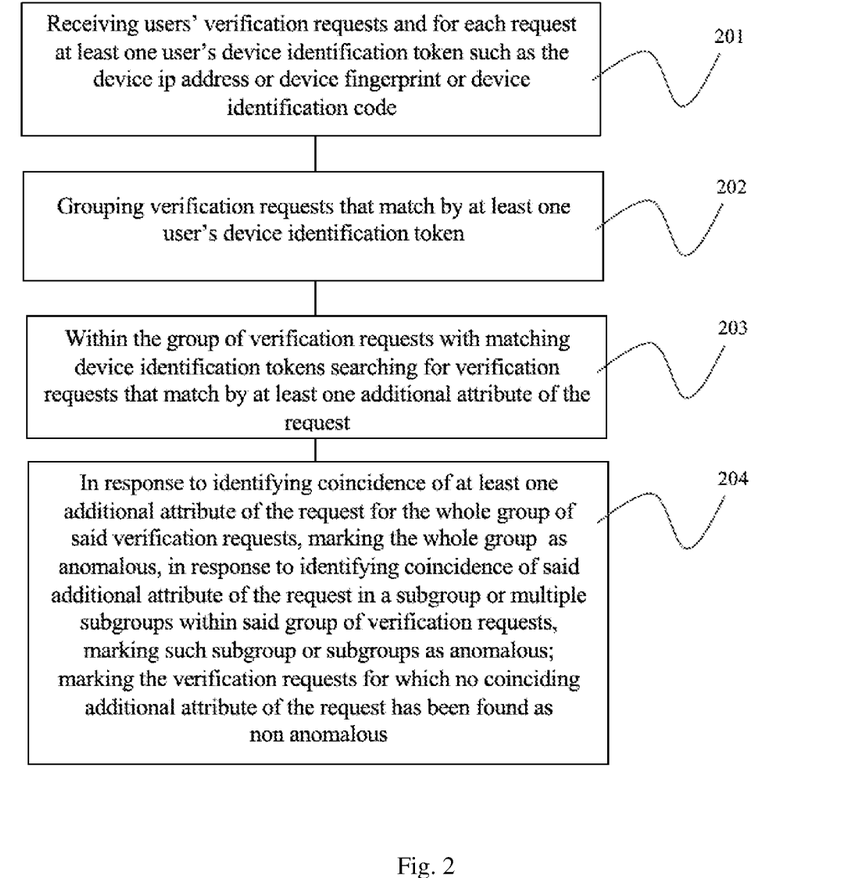
FIG. 2—block diagram illustrating one of possible embodiments

A method for detecting anomalies in groups of user verification requests performed by a processor comprising the following steps (FIG. 2): receiving users' verification requests and for each request at least one users' device identification token such as device ip address or device fingerprint or device identification code; grouping verification requests that match by user's device identification token; within the group of verification requests with matching user's device identification tokens searching for verification requests that match by at least one additional attribute; in response to identifying coincidence of at least one additional attribute of the request for the whole group of said verification requests, marking the whole group as anomalous, in response to identifying coincidence of said additional attribute of the request in a subgroup or multiple subgroups within said group of verification requests, marking such subgroup or subgroups as anomalous; otherwise, marking the verification requests for which no coinciding additional attribute of the request has been found as non anomalous.

Figure 3:
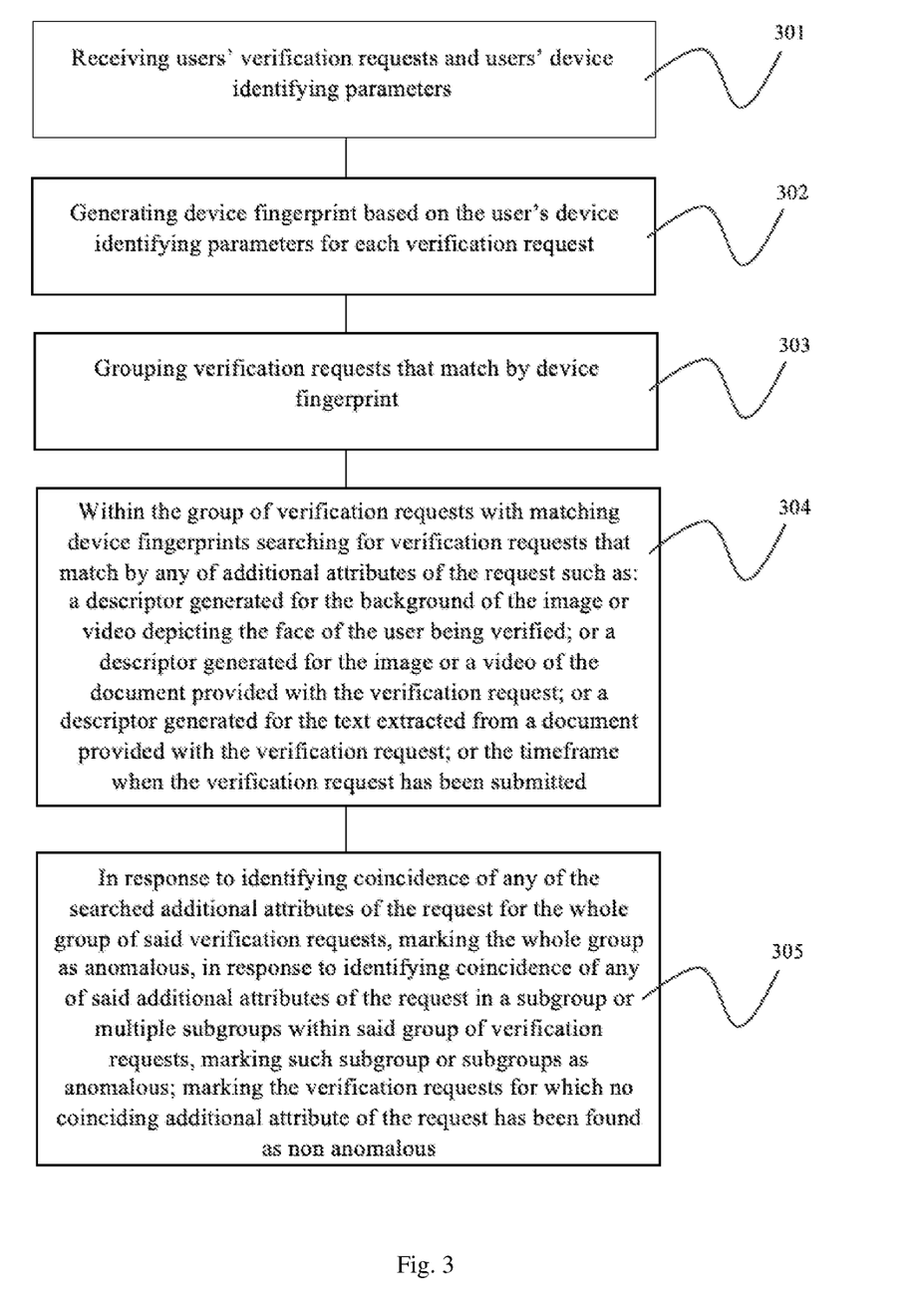
FIG. 3—block diagram illustrating one of possible embodiments

A method for detecting anomalies in groups of user verification requests performed by a processor comprising the following steps (FIG. 3): receiving users' verification requests and users' device identifying parameters; generating device fingerprint based on the user's device identifying parameters for each verification request; grouping verification requests that match by device fingerprint; within the group of verification requests with matching device fingerprints searching for verification requests that match by any of additional attributes of the requests such as: a descriptor for the background of the image or video depicting the face of the user being verified; or a descriptor generated for the the image or video of the background of the document provided with the verification request; or a descriptor generated for the text extracted from a document provided with the verification request; or the timeframe (time and date) when the verification request has been submitted; or the timeframe when the verification request has been submitted; in response to identifying coincidence of any of the searched additional attributes of the requests for the whole group of said verification requests, marking the whole group as anomalous, in response to identifying coincidence of any of the searched additional attributes of the request in a subgroup or multiple subgroups within said group of verification requests, marking such subgroup or subgroups as anomalous; otherwise, marking the verification requests for which no coinciding additional attribute of the request has been found as non anomalous.

In some embodiments searching (operation) for verification requests that match by any of additional attributes of the requests is done sequentially for each said additional attribute of the request.

In some embodiments searching (operation) for verification requests that match by any of additional attributes of the requests is done simultaneously for all said additional attributes of the requests.

Figure 4:
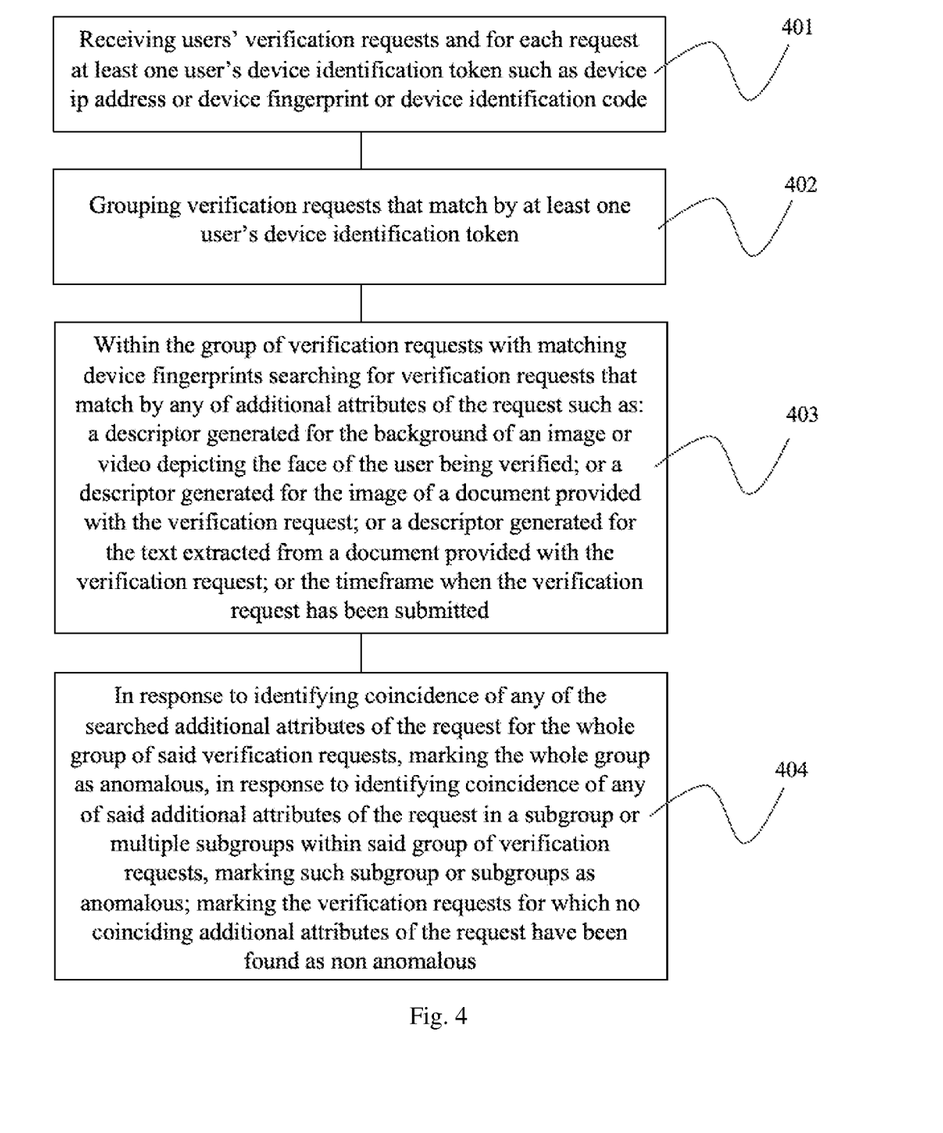
FIG. 4—block diagram illustrating one of the possible embodiments

A method for detecting anomalies in groups of user verification requests performed by a processor comprising the following steps (FIG. 4): receiving users' verification requests and for each request at least one user's device identification token such as device ip address or device fingerprint or device identification code; grouping verification requests that match by at least one user's device identification token; within the group of verification requests with matching device fingerprints searching for verification requests that match by any of additional attributes of the requests such as: a descriptor for the background of the image or video depicting the face of the user being verified; or a descriptor generated for the background of the image or video of the document provided with the verification request; or a descriptor generated for the text extracted from a document provided with the verification request; or the timeframe (time and date) when the verification request was submitted; or the timeframe when the verification request has been submitted; in response to identifying coincidence of any of the searched additional attribute of the requests for the whole group of said verification requests, marking the whole group as anomalous, in response to identifying coincidence of any of the searched additional attribute of the request in a subgroup or multiple subgroups within said group of verification requests, marking such subgroup or subgroups as anomalous; otherwise, marking the verification requests for which no coinciding additional attribute of the request has been found as non anomalous.

DETAILED DESCRIPTION

In some embodiments, the solution may be used in the course of users (persons) verification for various types of registration or know-your-client compliance checks for services, such as online banking, insurance, taxi, carsharing and other. In this case, a potential user logs into the application or web resource, interacts with it; in this process the user's device data, user's credentials and documents required for verification are collected. This data can be included in a verification request and sent to the server (system) for verification.

In some embodiments, the described technical solution may be executed by an application installed on the user's device or on an external service (server), and the external service may be provided via internet browser (software as a service model).

A method for detecting anomalies in groups of user verification requests performed by a processor includes the steps described hereinafter. The steps are numbered for ease of understanding, these steps are not shown in the figures, although in various embodiments these steps are present in FIG. 1-4.

Step 1001: Receive users' verification requests (plurality of requests) and users' device identifying parameters or device identification tokens corresponding to each request.

In some embodiments, the verification requests include, but are not limited to, personal and/or non-personal data of the user and parameters of the device from which the user is performing a non-registration request, access, or other action that requires verification.

In some embodiments, the requests include: the user's full name, address, contact information, image (a photograph or a video) depicting the face of the user, documents (images or videos thereof or machine-readable documents).

In some embodiments, the documents include: id card, passport, driver's license, residence permit, documents to prove the residence address of the user (a utility bill, a rental agreement, a bank statement, a registration certificate etc).

In some embodiments, the user's device may be any device with a processor capable of submitting user verification requests via a network (a smartphone, tablet, laptop, personal computer).

In some embodiments, the parameters identifying the user device are actively or passively collected.

In some embodiments, active collection may involve installing additional software on the user's device used to pass verification that allows access to system information and other device data, such as serial numbers of device components, data about installed applications, etc. Such software is installed with the user's consent and may be a separate verification application or a part of the software belonging to the service for which the verification is requested.

In some embodiments, passive collection is the collection of the device identifying parameters available without installing additional applications on the user's device, such as, but not limited to, ip address, timezone, screen size, platform, data about cursor movements, mouse movements, keystrokes or taps on the device, data about the installed browser and its add-ons, settings, and e.g., but not limited to.

Examples of some basic device parameters that can be collected on the user's device are: userAgent, platform, language, fonts, plugins, plugins, timezone, screen size-width?: number, height?: number.

Examples of some additional device parameters that are collected on the user's device: webdriver, color depth, device memory size (RAM), hardware concurrency (number of logical processors (or cores) available on a user's device like CPU cores), cpu class (f.e. x_86, x86_64, ARM and e.t.c.), canvas, webgl, webgl vendor and renderer, adBlock presence flag, touch support, audio, open in incognito mode flag, geolocation, VPN usage etc.

In some embodiments the device identification token is the device ip address or device fingerprint or device identification code.

In some embodiments the device ip address, or Internet Protocol address, is a numerical label assigned to each device participating in a computer network that uses the Internet Protocol for communication.

In some embodiments the device identification code is a unique, anonymized string of numbers or letters or other symbols that identifies an individual device such as smartphone, tablet, computer, etc. In some embodiments the device identification code is generated by the software on the user's device used to pass verification. In some embodiments the software used for verification is an application of the service for which the user is passing the verification process. In some embodiments the application used for verification is a standalone application of the verification service.

A device fingerprint—or device fingerprinting—is a method to identify a device using a combination of attributes provided by the device configuration and how the device is used. The attributes collected as data to build the device fingerprint can vary depending on technology used to generate the fingerprint. The device fingerprint is a hash value encoding the device parameters that allows identification of a unique device.

Canvas fingerprinting (canvas parameter) is a specific kind of browser fingerprinting. For example, in HTML5, drawing operations can render differently depending on one's computer's software and hardware characteristics. One can run JavaScript code that can generate an image and use it to make a unique fingerprint.

Webgl—WebGL Fingerprinting. Like the canvas element, WebGL is a JavaScript API that renders on-screen images and graphics. An image is rendered with a fixed size and because different GPUs use different algorithms to display it, it is possible to estimate the kind of graphics card the user has installed. A WebGL fingerprint detects graphics card model, screen resolution.

An example of webglVendorAndRenderer is an "Imagination Technologies~PowerVR Rogue GE8320".

In some embodiments, the step of collecting user device data may be performed by a third-party service that generates a device fingerprint based thereon, described further below.

In some embodiments, the ip address or device identifying parameters are collected with each user action during the generation of a verification request, e.g., uploading files (photos, documents). In some embodiments, the ip address or device fingerprint may change, e.g., due to a change in connection (from 4g to wi-fi) or e.g., the user may continue the process on another device, but not limited to.

Step 1002: generate device fingerprint for each verification request or receive user's device ip address for each verification request.

In some embodiments, in case the device fingerprint is not readily available and the user's device identifying parameters are collected, such device parameters are used to generate device fingerprint (for device fingerprinting).

Some of the most common device parameters used for device fingerprinting may include but are not limited to the parameters identifying the user's device that are described above, ip address, HTTP request headers, plugins or fonts that the user has installed on their device, the screen resolution of the device, the battery information of the device, the operating system of the device, flash data, VPN and browser information, type of web browser and browser version, time zone settings, language settings. Such attributes can be actively or passively collected as described above.

The possibility of two devices having the exact same combination of attributes is low, making this method useful for identifying unique devices. The collected device attributes are processed and combined to create a unique identifier or a hash value. This hash value represents the device's fingerprint, which can be used to distinguish it from other devices.

In some embodiments, the fingerprint may be received along with the verification request, bypassing the generation step.

Step 1003: grouping verification requests that match by the user's device identification token Finding verification requests with matching identification tokens indicates that such verification requests have likely been submitted using the exact same device. Multiple verification attempts from the same device are one of the indicators of mass registration of fake accounts (fraudulent serial registration).

In some embodiments, device identification token is a device fingerprint (either received or generated) or the user's device ip address or a device identification code.

In some embodiments, grouping of verification requests may be performed using a filtering operation.

In some embodiments, verification requests, as they are received, may be stored in a database for easier subsequent processing.

In some embodiments, searching for verification requests is performed in a database, or RAM, or other memory types (HDD, SSD, etc).

In some embodiments, verification requests with identical (matching) device fingerprints or ip addresses or users' device identification codes or other device identification tokens are selected. Such selection may be performed, for example, by sql queries using a GROUP BY operator in the case of storing requests in a relational database. As an illustrative example, hash tables can be used, where device fingerprint or ip address is used as a key. This implies the realization when one key corresponds to many values (in this case, many applications for verification), which allows to immediately detect such groups as applications are added.

In some embodiments, when the device fingerprint or ip address is collected at each user action, grouping of verification requests is performed across all such records (taking duplicates into account).

Step 1004: for each user group obtained in the previous step, the similarity of at least one additional attribute of the request is verified.

In order to increase precision of the solution, in addition to finding groups of verification requests with matching device identification tokens the identified groups are checked for matching additional attributes, indicating that such verification requests have likely been submitted in an attempt of mass registration of fake accounts.

In some embodiments, the additional attribute is, but is not limited to: document descriptors, background descriptors, the verification request submission time, the verification request submission timeframe.

In some embodiments, the additional attribute or attributes may be, but are not limited to:
  the descriptor generated for the background of the image or video depicting the face of the user being verified;
  the descriptor generated for the background of the image or video of the document provided with the verification request;
  the descriptor generated for the text extracted from a document provided with the verification request;
  the timeframe when the verification request has been submitted.

In some embodiments the descriptors are generated for the background of the image or video depicting the face of the user being verified that has been submitted to confirm the identity of the user (liveness verification).

In some embodiments, descriptors are generated for the background of the image or video of the document provided with the verification request (such as proof of address, passport, id card, driver license), and the like.

In some embodiments, descriptors are generated for the text extracted from the document provided with the verification request (such as proof of address, passport, id card, driver license), and the like.

In some embodiments, the descriptor is a vector embedding that represents image data (a static image or a video) as a point in a multidimensional space.

In some embodiments, descriptors' generation for each identification document's image data is done using a model configured to determine at least one of: a set of visual features not associated with the user's identification document represented on the identification document image data; a set of visual features not associated with the user's face and/or identification document's data pictured on the identification document represented on the image data.

In some embodiments, generation of a descriptor for each image data is done using a model configured to determine a set of visual features not associated with the person's face for an input image data.

In some embodiments, the document's descriptors are generated using text extracted from the document, such as using OCR (object character recognition) technology.

In some embodiments, Sentence-BERT like models are used to generate descriptors for text. In some embodiments, a sentence-transformers like model such as paraphrase-multilingual-MiniLM-L12 is used.

In some embodiments, the descriptor for the time factor is a difference between timestamps of authorization requests.

In some embodiments, the descriptor (for an image or a video) is a numerical representation of visual features of image data.

In some embodiments, the descriptor (for an image or a video) is a vector embedding that represents image data as a point in a multidimensional space.

In some embodiments, the descriptor (for an image or a video) is a hash value of visual features of the image data.

In some embodiments, the descriptor (for text data) is a vector embedding that represents text data as a point in a multidimensional space.

In some embodiments, Euclidean Distance, Minkowski Distance, Cosine Similarity, and Dot Product measures are used to evaluate the similarity of the descriptors.

Within the group, pairwise distances (similarity measure) between the calculated descriptors of the additional attribute related to different applications for verification are determined. In response to the fact that the distance between two descriptors is less than the predefined (set) threshold (value).

In graph theory, a component of an undirected graph is a connected subgraph that is not part of any larger connected subgraph. The components of any graph partition its vertices into disjoint sets, and are the induced subgraphs of those sets. A graph that is itself connected has exactly one component, consisting of the whole graph. Components are sometimes called connected components.

In some embodiments, the predetermined thresholds may be such but not limited to, as the thresholds may be upgraded or adapted during operation:
  min_net_size—4—the minimum size of the entire group
  min_subnet_size—2—minimum size of a subgroup
  poa_max_distance—[0.05 . . . 0.2]—threshold on distances by proof of address
  doc_max_distance—[0.03 . . . 0.2]—on photo of docs
  selfie_max_distance—[0.05 . . . 0.2]—selfies
  max_time_diff—30 minutes—time threshold for the whole group
  max_time_diff_subgraph—10 minutes—time threshold for subgroup In some embodiments, grouping verification requests is performed as described below: within the group of verification requests with matching user's device identification tokens searching for verification requests that match by any of additional attribute of the requests such as: a descriptor for the background of the image or video depicting the face of the user being verified; or a descriptor generated for the background of the image or video of the document provided with the verification request; or a descriptor generated for the text extracted from a document provided with the verification request; or the timeframe (time and date) when the verification request has been submitted; or the timeframe when the verification request has been submitted.

Step 1005: In response to identifying coincidence of any of said additional attributes of the request for the whole group of said verification requests, marking the whole group as anomalous, in response to identifying coincidence of any of said additional attribute of the request in a subgroup or multiple subgroups within said group of verification requests, marking such subgroup or subgroups as anomalous; otherwise, marking the verification requests for which no coinciding additional attribute of the request has been found as non anomalous.

Within the subgroup, pairwise distances (similarity measure) between the calculated descriptors of the additional attribute of the request (additional factor) related to different verification requests are determined. In response to the fact that the distance between two descriptors is less than the predefined (set) threshold (value), a graph edge is formed, where the vertices are the applications corresponding to the descriptors. After enumeration of all pairs, a graph is formed in which the search for connectivity components (subgroups of verification requests having similar attributes) is performed.

In some embodiments, if the number of elements (vertices) of a connectivity component is less than a predetermined threshold (predetermined value), the group is not marked as anomalous, if the threshold is exceeded, the queries included in the group are marked as anomalous.

In some embodiments, requests for verification that fall into one connectivity component are marked as anomalous.

Step 1005 is repeated for all subsequent additional attributes (if available) for all records in the group.

FIG. 1-4 illustrate some of the described embodiments of the invention.

Figure 5:
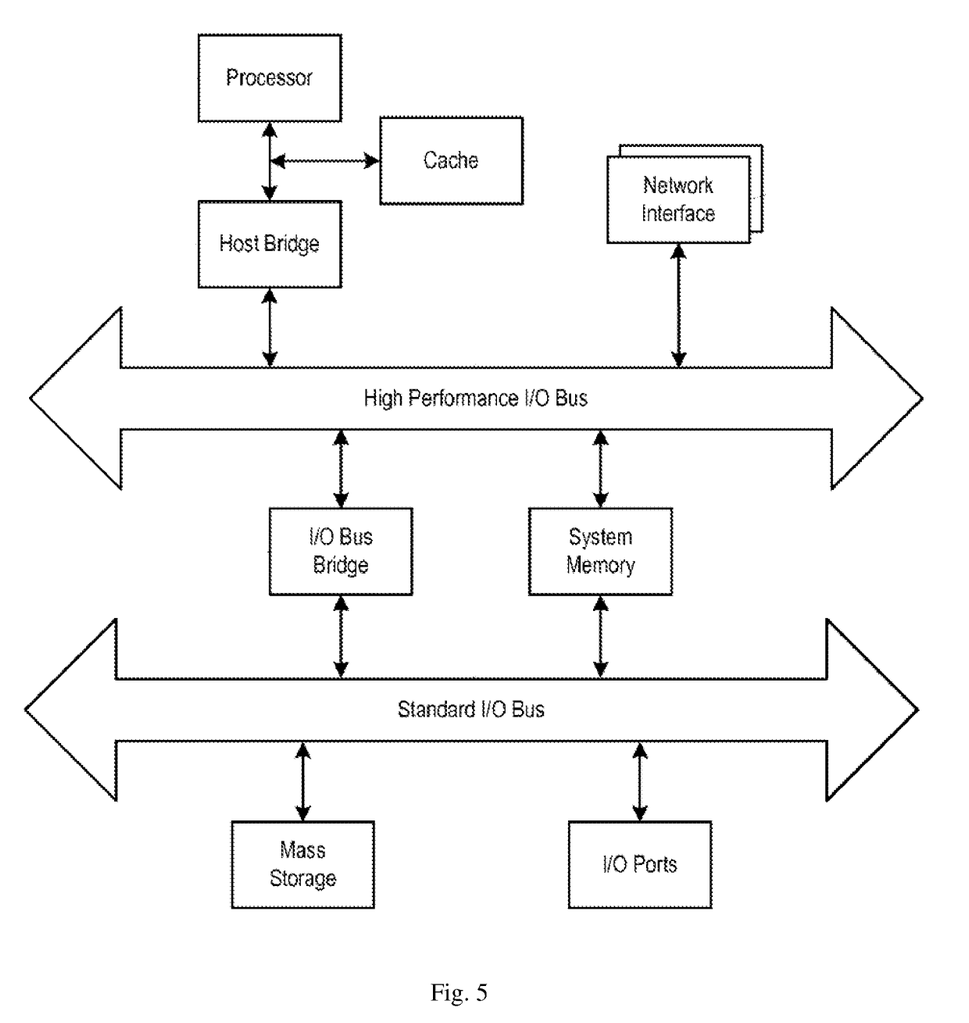
FIG. 5—scheme of possible realization of the system implementing the described technical solution

The foregoing processes and features can be implemented by a wide variety of machine and computer system architectures and in a wide variety of network and computing environments. FIG. 5 illustrates an example of a computer system that may be used to implement one or more of the computing devices identified above. The computer system includes sets of instructions for causing the computer system to perform the processes and features discussed herein. The computer system may be connected (e.g., networked) to other machines. In a networked deployment, the computer system may operate in the capacity of a server machine or a client machine in a client-server network environment, or as a peer machine in a peer-to-peer (or distributed) network environment. In an embodiment of the invention, the computer system may be one server among many that constitutes all or part of the verification/authentication system.

The computer system includes a processor, a cache memory, and one or more executable modules and drivers, stored on a computer readable medium, directed to the processes and features described herein. Additionally, the computer system includes a high performance input/output (I/O) bus and a standard I/O bus. A host bridge couples processor to high performance I/O bus, whereas I/O bus bridge couples the two buses and to each other. A system memory and one or more network/communication interfaces couple to the bus. The computer system may further include video memory and a display device coupled to the video memory (not shown). Mass storage, and I/O ports couple to the bus. The computer system may optionally include a keyboard and pointing device, a display device, or other input/output devices (not shown) coupled to the bus. Collectively, these elements are intended to represent a broad category of computer hardware systems For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described which may be variously combined and included in some embodiments but also variously omitted in other embodiments. Similarly, various features are described that may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for detecting anomalies in groups of user verification requests performed by one or more processors comprising the following steps:

receiving users' verification requests and users' device identifying parameters from users' devices, for each user's device generating a device fingerprint based on the user's device identifying parameters for each verification request using a one or more fingerprinting methods that encodes hardware or software characteristics of the device as a string of alphanumeric characters, grouping verification requests that match by device fingerprint, performing analysis of additional attributes within the group of verification requests with matching device fingerprints, in response to identifying a match within of at least one additional attribute of the request for the whole group of said verification requests, marking the whole group as anomalous, in response to identifying coincidence of said additional attribute of the request in a subgroup or multiple subgroups within said group of verification requests, marking such subgroup or subgroups as anomalous; otherwise, performing further analysis using predefined threshold values and one or more clustering algorithms and marking the verification requests for which no coinciding additional attribute of the request has been found as non-anomalous, wherein the additional attribute of the request is a descriptor generated using a convolutional neural network for the background of the image or video depicting the face of the user being verified, and the matching is performed by identifying descriptors that surpass predetermined similarity threshold within the descriptors database, or the additional attribute of the request is a descriptor generated using a convolutional neural network for the background of the image or video depicting a document provided with the verification request and the matching is performed by identifying descriptors that surpass predetermined similarity threshold within the descriptors database, or the additional attribute of the request is a descriptor generated using a convolutional neural network for the text extracted from a document provided with the verification request and the matching is performed by identifying descriptors that surpass predetermined similarity threshold within the descriptors database, or the additional attribute of the request is the time when the verification request has been submitted and the matching is performed by identifying the verification requests made within a predefined timeframe; and wherein in response to marking the verification requests as anomalous, rejecting them or subjecting them to additional checks.

2. The method according to claim 1, wherein the descriptor for the background of the image or video depicting the face of the user being verified is created using a model configured to encode a set of visual features not associated with the person's face.

3. The method according to claim 1, wherein the descriptor for the background of the image or depicting the document is created using a model configured to encode a set of visual features not associated with either of: the user's identification document or a set of visual features not associated with the user's face or identification document's data pictured on the identification document.

4. The method according to claim 1, wherein matching by device fingerprints is either done on the basis of a threshold value or on the basis of identical device fingerprints.

5. The method according to claim 1, wherein the text is extracted from a document provided with the verification request using optical character recognition (OCR) technologies.

6. A method for detecting anomalies in groups of user verification requests performed by one or more processors comprising the following steps:

receiving from users' devices users' verification requests and for each request at least one user's device identification token such as the device ip address or device identification code or device fingerprint generated using a one or more device fingerprinting methods that encodes hardware or software characteristics of the device as a string of alphanumeric characters, grouping verification requests that match by at least one user's device identification token, performing analysis of additional attributes within the group of verification requests with matching device identification tokens, in response to identifying a match within of at least one additional attribute of the request for the whole group of said verification requests, marking the whole group as anomalous, in response to identifying coincidence of said additional attribute of the request in a subgroup or multiple subgroups within said group of verification requests, marking such subgroup or subgroups as anomalous; otherwise, performing further analysis using predefined threshold values and one or more clustering algorithms and marking the verification requests for which no coinciding additional attribute of the request has been found as non-anomalous, wherein the additional attribute of the request is a descriptor generated using a convolutional neural network for the background of the image or video depicting the face of the user being verified and the matching is performed by identifying descriptors that surpass predetermined similarity threshold within the descriptors database, or the additional attribute of the request is a descriptor generated using a convolutional neural network for the background of the image or a video depicting a document provided with the verification request and the matching is performed by identifying descriptors that surpass predetermined similarity threshold within the descriptors database, or the additional attribute of the request is a descriptor generated using a convolutional neural network for the text extracted from a document provided with the verification request and the matching is performed by identifying descriptors that surpass predetermined similarity threshold within the descriptors database, or the additional attribute of the request is the time when the verification request has been submitted and the matching is performed by identifying the verification requests made within a predefined timeframe; and wherein in response to marking the verification requests as anomalous, rejecting them or subjecting them to additional checks.

7. The method according to claim 6, wherein the user's device identification code is provided using an additional software module installed on the user's device, and wherein the descriptor for the background of the image or video depicting the face of the user being verified is created using a model configured to encode a set of visual features not associated with the person's face.

8. The method according to claim 6, wherein the descriptor for the background of the image or depicting the document is created using a model configured to encode a set of visual features not associated with either of: the user's identification document or a set of visual features not associated with the user's face or identification document's data pictured on the identification document.

9. The method according to claim 6, wherein matching by device fingerprints is either done on the basis of a threshold value or on the basis of identical device fingerprints, and wherein the text is extracted from a document provided with the verification request using optical character recognition (OCR) technologies.

10. The method according to claim 6, wherein in response to marking the verification requests as anomalous, rejecting them or subjecting them to additional checks.

11. A method for detecting anomalies in groups of user verification requests performed by one or more processors comprising the following steps:

receiving users' verification requests and users' device identifying parameters from users' devices, for each user's device generating a device fingerprint based on the user's device identifying parameters for each verification request using a one or more device fingerprinting methods that encodes hardware or software characteristics of the device as a string of alphanumeric characters, grouping verification requests that match by device fingerprint, within the group of verification requests with matching device fingerprints performing analysis of any of additional attributes of the request such as: a descriptor generated for the background of the image or video depicting the face of the user being verified;

or a descriptor generated for the image or a video of the document provided with the verification request;

or a descriptor generated for the text extracted from a document provided with the verification request; or the timeframe when the verification request has been submitted, in response to identifying a match within of any of the searched additional attributes of the request for the whole group of said verification requests, marking the whole group as anomalous, in response to identifying coincidence of any of said additional attributes of the request in a subgroup or multiple subgroups within said group of verification requests, marking such subgroup or subgroups as anomalous;

otherwise, performing further analysis using predefined threshold values and one or more clustering algorithms and marking the verification requests for which no coinciding additional attributes of the request have been found as non-anomalous, wherein the searching for verification requests that match by any of additional attributes of the request is done sequentially for each said additional attribute of the request, or the searching for verification requests that match by any of additional attributes of the request is done simultaneously for all said additional attributes of the request; and wherein in response to marking the verification requests as anomalous, rejecting them or subjecting them to additional checks.

12. The method according to claim 11, wherein the descriptor for the background of the image or video depicting the face of the user being verified is created using a model configured to encode a set of visual features not associated with the person's face.

13. The method according to claim 11, wherein the descriptor for the background of the image or depicting the document is created using a model configured to encode a set of visual features not associated with either of: the user's identification document or a set of visual features not associated with the user's face or identification document's data pictured on the identification document.

14. The method according to claim 11, wherein matching by device fingerprints is either done on the basis of a threshold value or on the basis of identical device fingerprints, and wherein in response to marking the verification requests as anomalous, rejecting them or subjecting them to additional checks, and wherein the text is extracted from a document provided with the verification request using optical character recognition (OCR) technologies.

15. A method for detecting anomalies in groups of user verification requests performed by one or more processors comprising the following steps:

receiving users' verification requests and for each request at least one user's device identification token such as device ip address or device identification code or device fingerprint generated using a one or more device fingerprinting methods that encodes hardware or software characteristics of the device as a string of alphanumeric characters, grouping verification requests that match by at least one user's device identification token, within the group of verification requests with matching device fingerprints performing analysis of any of additional attributes of the request such as:

a descriptor generated for the background of an image or video depicting the face of the user being verified;

or a descriptor generated for the image of a document provided with the verification request; or a descriptor generated for the text extracted from a document provided with the verification request;

or the timeframe when the verification request has been submitted, in response to identifying a match within of any of the searched additional attributes of the request for the whole group of said verification requests, marking the whole group as anomalous, in response to identifying coincidence of any of said additional attributes of the request in a subgroup or multiple subgroups within said group of verification requests, marking such subgroup or subgroups as anomalous;

otherwise, performing further analysis using predefined threshold values and one or more clustering algorithms and marking the verification requests for which no coinciding additional attributes of the request have been found as non-anomalous, wherein the searching for verification requests that match by any of additional attributes of the request is done sequentially for each said additional attribute of the request, or the searching for verification requests that match by any of additional attributes of the request is done simultaneously for all said additional attributes of the request; and wherein in response to marking the verification requests as anomalous, rejecting them or subjecting them to additional checks.

16. The method according to claim 15, wherein the user's device identification code is provided using an additional software module installed on the user's device, and wherein the text is extracted from a document provided with the verification request using optical character recognition (OCR) technologies.

17. The method according to claim 15, wherein the descriptor for the background of the image or depicting the document is created using a model configured to encode a set of visual features not associated with either of: the user's identification document or a set of visual features not associated with the user's face or identification document's data pictured on the identification document.

18. The method according to claim 15, wherein matching by device fingerprints is either done on the basis of a threshold value or on the basis of identical device fingerprints, and wherein the descriptor for the background of the image or video depicting the face of the user being verified is created using a model configured to encode a set of visual features not associated with the person's face.

19. The method according to claim 15, wherein in response to marking the verification requests as anomalous, rejecting them or subjecting them to additional checks.

* * * * *